(12) United States Patent
Becker

(10) Patent No.: US 7,362,004 B2
(45) Date of Patent: Apr. 22, 2008

(54) WIND TURBINE DEVICE

(76) Inventor: William S. Becker, 625 Dalton Pl., Northbrook, IL (US) 60082

( * ) Notice: Subject to any disclaimer, the term of this patent is extended or adjusted under 35 U.S.C. 154(b) by 0 days.

(21) Appl. No.: 11/529,854

(22) Filed: Sep. 29, 2006

(65) Prior Publication Data

US 2007/0018464 A1    Jan. 25, 2007

Related U.S. Application Data

(62) Division of application No. 10/629,370, filed on Jul. 29, 2003, now Pat. No. 7,132,760.

(51) Int. Cl.
*F03D 9/00* (2006.01)
*H02P 9/04* (2006.01)

(52) U.S. Cl. .......................... 290/55; 290/44

(58) Field of Classification Search ................. 290/55, 290/44; 415/7, 2.1, 4.2, 4.5, 4.4, 907; 416/132 B
See application file for complete search history.

(56) References Cited

U.S. PATENT DOCUMENTS

| | | | |
|---|---|---|---|
| 591,962 A | 10/1897 | Evison | |
| 953,891 A | 4/1910 | Atkins | |
| 974,995 A | 11/1910 | Schies | |
| 1,100,332 A | * 6/1914 | Smith | .......... 416/175 |
| 1,334,485 A | * 3/1920 | Clipfell et al. | ............ 290/55 |
| 1,586,914 A | 6/1926 | Palm | |
| 1,697,574 A | 1/1929 | Savonius | |
| 1,744,924 A | 1/1930 | Sargent | |
| 1,835,018 A | 12/1931 | Darrieus | |

(Continued)

FOREIGN PATENT DOCUMENTS

CA    1236030    5/1988

(Continued)

OTHER PUBLICATIONS

Furze, J., "Stealth Wind Turbines: Designs and Technologies to Reduce Visual Pollution," Refocus; Mar./Apr. 2003, http://www.refocus.net/mar2002_2.html. Printed May 9, 2002.

(Continued)

*Primary Examiner*—Julio Cesar Gonzalez
(74) *Attorney, Agent, or Firm*—Knechtel, Demeur & Samlan

(57) ABSTRACT

A hybrid blade wind turbine device formed of at least a pair of straight outer airfoil blades, and a pair of inner helical wing blades, as supported for rotation within a safety protective cage structure, which wind turbine can be mounted in the vertical, horizontal, or other aligned operational positions. The inner helical half wing blades, being preferably somewhat shorter than the length of the outer airfoil blades, act to "regularize" the swirling wind regime flowing through the hybrid wind turbine, so as to maximize the efficiency of the outer airfoil blades. The helical half wing blades can be formed of individual segmented vane segments to provide improved operational capabilities for the overall hybrid wind turbine. To best harness annualized available wind conditions, the hybrid wind turbine can be customized, through modification of the number of vane segments, the selection of the specific shape of the outer airfoil blades, and the specific operational positioning of the outer airfoil blades. Alternatively, the helical half wing blades can be formed as generally smooth-walled blades.

15 Claims, 10 Drawing Sheets

U.S. PATENT DOCUMENTS

| | | | |
|---|---|---|---|
| 2,020,900 A | | 11/1935 | Methvin |
| 3,856,432 A | | 12/1974 | Campagnuolo et al. |
| 3,918,839 A | | 11/1975 | Blackwell et al. |
| 4,004,861 A | | 1/1977 | Soules |
| 4,039,849 A | * | 8/1977 | Mater et al. .................. 290/55 |
| 4,112,311 A | | 9/1978 | Theyse |
| 4,142,822 A | * | 3/1979 | Herbert et al. ............. 415/53.1 |
| 4,168,439 A | | 9/1979 | Palma |
| 4,204,805 A | | 5/1980 | Bolie |
| 4,236,866 A | * | 12/1980 | Zapata Martinez .......... 415/4.4 |
| 4,293,274 A | | 10/1981 | Gilman |
| 4,334,823 A | | 6/1982 | Sharp |
| 4,551,631 A | * | 11/1985 | Trigilio ....................... 290/55 |
| 4,659,940 A | | 4/1987 | Shepard |
| 4,684,817 A | | 8/1987 | Goldwater |
| D300,932 S | | 5/1989 | Sikes |
| 5,380,149 A | * | 1/1995 | Valsamidis .................. 415/2.1 |
| 5,425,619 A | | 6/1995 | Aylor |
| 5,463,257 A | * | 10/1995 | Yea ............................. 290/55 |
| 5,760,515 A | | 6/1998 | Burns |
| 6,172,429 B1 | * | 1/2001 | Russell ........................ 290/54 |
| 6,242,818 B1 | | 6/2001 | Smedley |
| 6,246,125 B1 | | 6/2001 | Atxtell |
| 2005/0169742 A1 | * | 8/2005 | Kane .......................... 415/4.4 |
| 2006/0198724 A1 | * | 9/2006 | Bertony ...................... 415/4.4 |
| 2006/0257240 A1 | * | 11/2006 | Naskali et al. ............... 415/4.4 |
| 2007/0029807 A1 | * | 2/2007 | Kass ........................... 290/55 |

FOREIGN PATENT DOCUMENTS

| | | |
|---|---|---|
| DE | 187865 | 6/1906 |
| DE | DT 25 40 757 A1 | 8/1976 |
| EP | 0 040 193 B1 | 7/1984 |
| FI | 65940 | 9/1928 |
| FR | 961999 | 5/1950 |
| FR | 1 021 619 | 2/1953 |
| FR | 2295259 | 7/1976 |
| JP | 60-090992 | 5/1985 |
| PL | 59680 | 3/1957 |
| WO | WO 81/01443 A1 | 5/1981 |
| WO | WO 99/04164 A1 | 1/1999 |

OTHER PUBLICATIONS

"Wind Power," Von Nostraud's "Scientific Encyclopedia," 8th Ed.

"Mission Statement of Shield Ltd.," Shield Ltd SunFin Solar Collector & Absorbers, http://www.shield.fi/mission.html. Printed May 9, 2002.

"Jaspira Turbine, World Wide patented Innovation," Shield Ltd SunFin Solar Collectors & Absorbers, http://www/shield.fi/turbine. html. Printed May 9, 2002.

Shonfield, K., "Green hopes Gone With the Wind," The Architects' Journal, Apr. 5, 2001.

Refocus Magazine—The International Renewable Energy Magazine, various articles, Mar./Apr. 2002.

"Small Wind Turbines: The Unsung Heroes of the Wind Industry," Refocus, http://www.re-focus.net/mar2002_3.html. Printed May 9, 2002.

Wakui, T., Tanzawa, Y., Hashizume, T., Outa, E., Usui, A., "Optimum Method of Operataing the Wind Turbine-Generator Systems Matching the Wind Condition and Wind Turbine Type," Proceedings of the World Renewable Energy Congress-VI, vol. IV, (Jul. 2000), pp. 2348-2351.

Wakui, T., Hashizume, T., Outa, E., "Operating Methods of Wind Turbine-Generator Systems with a Darrieus Rotor Considering Conformability to Wind Conditions," Proceedings of the 3rd ASME/JSME joint Fluids Engineering Conference, FEDSM99-7821, (Jul. 1999), pp. 1-9.

Wakui, T., Hashizume, T., Outa, E., "Design of a Wind Turbine-Generator system Considering the Conformability to Wind Velocity Fluctuations," Proceedings of the Renewable and Advanced Energy Systems for the 21st Century, RAES99-7717, (Apr. 1999), pp. 1-6.

Wakui, T., Yamaguchi, K., Hashizume, T., Outa, E., Tanzawa, Y., "Effect of Operating Methods of Wind Turbine Generator System on Net Power Extraction Under Wind Velocity Fluctuations in Fields," Renewable Energy, 16, (1998), pp. 843-846.

Tanzawa, Y., Hashizume, T., Outa, E., Terashima, Y., Machiyama, T., "Dynamic Characteristics of the Self-Controlled Darrieus-Savonius Hybrid Wind Turbine System," Proceedings of the CSPE-JSME-ASME Interriation Conference on Power Engineering, vol. 1, (1995), pp. 115-121.

Machiyama, T., Terashima, Y., Hashizume, T., Outa, E., "A Way for Field Application of Darrieus Wind Turbine by Installing Savonius Rotor and Controlled Generator Load," Proceedings of the ASME Solar Engineering—1987, vol. I, (1987), pp. 217-225.

Windside Introduction, http://www.windside.com/painik/etusivu.htm. Printed Apr. 25, 2002.

Windside in Use, http://www.winside.com/wsinuse/wsinuse.htm. Printed Apr. 25, 2002.

Windside Models, http://www.windside.com/models/models.htm. Printed Apr. 25, 2002.

Windside Technical Information, http://www.windside.com/technic/technical.htm. Printed Apr. 25, 2002.

Moffett, "Can Windy City Live Up to its Reputation?" Chicago Sun-Times, http://www.suntimes.com/output/news/cst-nws-wind11.html. Printed Jun. 13, 2003.

Field Museum Wind Turbine Booklet.

Windside testing, http://www.windside.com/testing/testing.htm. Printed Apr. 25, 2002.

"Wind Power," Von Nostraud's "Scientific Encyclopedia," 8th Ed, no date/year.

"Jaspira-tuuliturbiinit," Shield Jaspira tuuliturbiinit, http://www.shield.fi/finnish/jaspira.html. Printed May 9, 2002.

Field Museum Wind Turbine Booklet, no date/year.

Windside Testing, http://www.windside.com/testing/testing.htm. Printed Apr. 25, 2002.

International Search Report for PCT/US03/23632 dated May 21, 2004.

* cited by examiner

WIND TURBINE DEVICE

I. RELATED PATENT APPLICATION

This patent application is a divisional of prior U.S. patent application, Ser. No. 10/629,370, filed Jul. 29, 2003, now U.S. Pat. No. 7,132,760.

II. FIELD OF THE INVENTION

This invention relates to wind turbine devices, and more particularly to a universal-axis wind turbine device having a combination of multiple blade designs and a surrounding safety cage structure.

III. BACKGROUND OF THE INVENTION

Various known designs of wind turbine structures include the common propeller blade type turbine, the so-called Darrieus blade type turbine, and the so-called Savonius blade type turbine.

Several Savonius or "S"-rotor blade designs are known, including those typified in Canadian Patent No. 1,236,030, EPO Publication No. 0040193 B1, French No. 961,999, German No. 187865, Japanese Publication No. 60-090992, Swedish No. 65,940, WIPO No. WO/99/04164, and U.S. Pat. Nos. 1,697,574 and 4,293,274. Each of those various Savonius-type blade designs have inherent limitations, including the limitation of noise during operation, excessive vibration during operation, a tendency to "run away" during elevated wind speed operations and often excessive drag created during rotation of the leeward or non-wind-gathering portion of the blade's movement.

Further, various Darrieus-type turbine blade designs are disclosed in U.S. Pat. Nos. 1,835,018, 2,020,900, 4,112,311, 4,204,805 and 4,334,823. However, these Darrieus-type designs also have inherent deficiencies, including that only the middle one-third of their blade length (at least for curved Darrieus blade versions) efficiently creates power; that the farther the distance from a curved blade to its axis of rotation, the greater the likelihood, especially in large scale power generation units, of a Darrieus type unit going into harmonic vibration and self-destructing; that all such Darrieus-blade type units are not self-starting, but need assistance in starting; and that in many wind conditions they can, on a periodic basis, use up more energy than they actually produce. Without proper controls and/or mechanical braking systems, Darrieus type units (like Savonius units) have been known to "run away" during elevated wind speed conditions.

Further yet, there have been attempts at combining a bucket-shaped Savonius-type drag blade system with a Darrieus-type curved lift blade system, as found in U.S. Pat. No. 3,918,839, and in Tanzawa, et al., "Dynamic Characteristics of the self-controlled Darrieus-Savonius Hybrid Wind Turbine System," Proceedings of the CSPE-JSME-ASME International Conference on Power Engineering, Vol. I, (1995), pp. 115-121 ("Tanzawa"). Yet in U.S. Pat. No. 3,918,839, significant difficulties arose relative to the operational, i. e., rotational, stability of the unit at high wind speeds. In Tanzawa, the addition of a Savonius bucket rotor to start the Darrieus rotor resulted in a reduction in the total turbine power and high braking torque at higher rotational rates. There were also the above-noted inherent problems present in all separate Darrieus and Savonius-type blade systems.

Most available wind turbine designs have problems of excessive noise and vibration, often self-destruct in high wind conditions, some require separate start-up, braking or stopping mechanisms, and many are not considered safe, readily insurable or building-code permitted, at least not for use in congested urban settings.

Thus, there has been an ongoing need for a wind turbine design that can be successfully incorporated into various building and tower structures, that produces minimal noise and vibration during operation, is capable of starting up and operating in each of low speed, steady, gusty, and high speed wind conditions, has a built-in self-regulation via an inherent structural geometry against over-speeding runaway conditions, is formed of blade designs that operate in essentially all wind conditions and produce moderate drag during full rotational operation, which is easy to manufacture and ship, and which can be housed in a safe operating package for use in crowded urban settings.

IV. SUMMARY OF THE INVENTION

The present invention comprises in one form a hybrid wind turbine formed of both an inner helical screw-type blade design, with the individual helical blades formed of flexible segmented vane members operable as an air valve to allow air to pass between them when in their leeward (non-wind-gathering) position relative to the wind so as to reduce blade drag, and at least a pair of outer generally straight airfoil blades, which are of greater overall length than the inner helical blades. The entire hybrid blade combination is mounted for rotation within a protective cage structure to prevent unwanted entry of humans, birds and other objects in the blade path, and to help with secure, low vibration mounting, safety and insurability for urban settings.

The inner segmented helical screw-type S blades permit early start up of the hybrid turbine at low wind speeds. They also act as wind brakes at unduly high wind speeds to prevent runaway conditions. The outer airfoil blades enable the hybrid wind turbine to achieve high rotational speeds and resultant high energy production efficiencies at upper wind speeds. Together the helical and airfoil blades help maximize harvesting of wind energy. The present hybrid wind turbine operates with minimal noise and vibration, particularly since the segmented helical vane members operate at a rotational (varying torque) rate that does not exceed the speed of the wind by more than three and a half times and with a varying profile that always presents generally the same overall blade area to the wind. (This is in distinct contrast to standard "non-twisted" "S" rotors which, in essence, offer a alternating high- or wide- and then a low- or narrow-profile to the wind as they rotate.) This acts to substantially eliminate the "banging" noise and harmful action, especially in the support bearings, as found in many non-helical, non-twisted prior art Savonius-type turbine blades. The segmented helical screw blades, formed into two helical half wing blades, can be selectively formed with different numbers, and hence widths, of elongated vane segments, and with different spacing between such vane segments, depending upon the operational height at which the hybrid wind turbine will be mounted, and also upon the average annual wind speed available at that operational height. Additionally, both the cross-sectional shape of the outer airfoils, and their operational distance from the inner helical blades, can be altered for the same reasons. The inner helical blades can be alternatively formed as generally smooth-walled blades, i. e., formed via an edge-abutting or slightly overlapping series of flat panel segments but that in either case do not have edge separation during rotational operation.

The present hybrid wind turbine is of universal axis such that it can be mounted horizontally, vertically, or at any other near vertical or angular operational orientation as desired, and as specific mounting surface conditions may require. It can be used in urban settings, such as a single generation point with minimal transmission loss, such as for a so-called "zero energy" building. The overall shape of the present hybrid wind turbine can be cylindrical, conical, frustro-conical, or other shape. Further, a belt-drive or direct-drive type permanent magnet alternator, a belt-drive or direct-drive type generator, or alternatively, a belt-drive or direct-drive type air motor can be used to harness and convert the wind-generated power from the hybrid wind turbine.

V. BRIEF DESCRIPTION OF THE DRAWINGS

The means by which the foregoing and other aspects of the present invention are accomplished and the manner of their accomplishment will be readily understood from the following specification upon reference to the accompanying drawings, in which.

Figure 1:
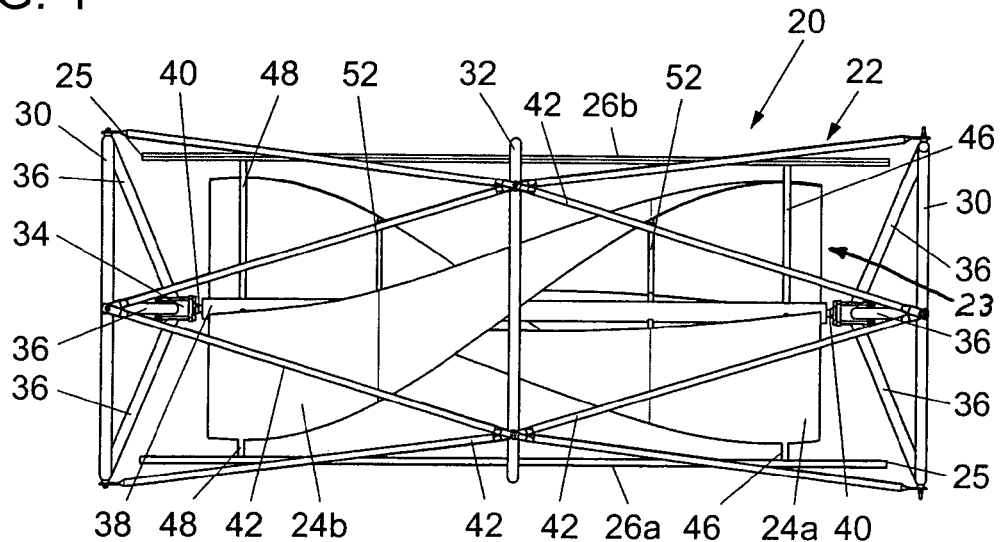
FIG. 1 is a front elevation view of the hybrid wind turbine of the present invention, showing certain blade and some protective cage components.
Figure 2:
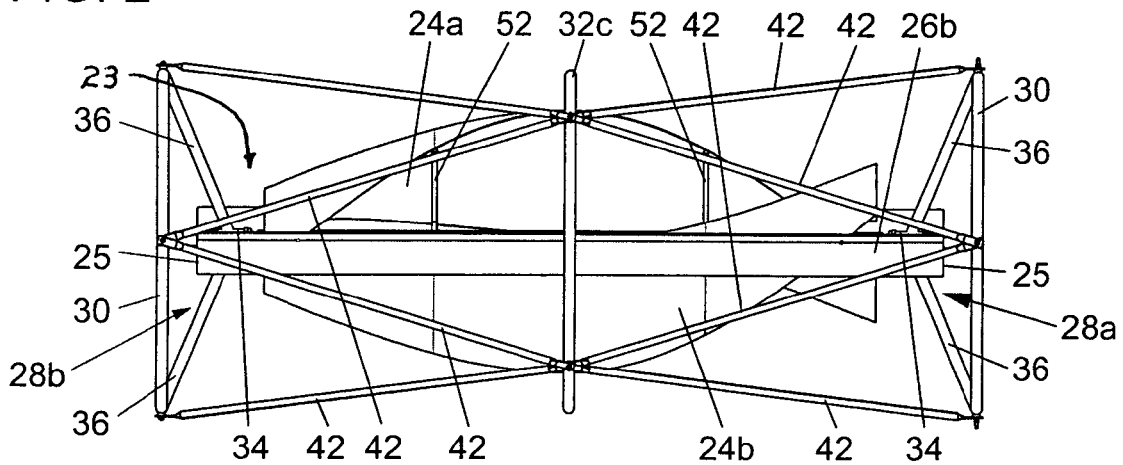
FIG. 2 is a top plan view of the hybrid turbine of FIG. 1.
Figure 4:
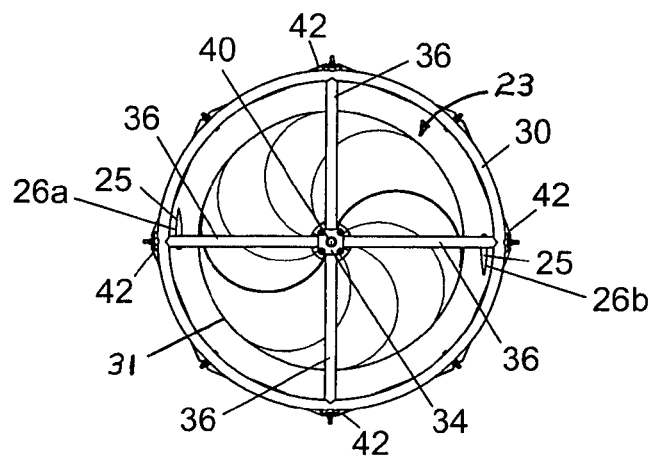
FIG. 4 is a left end view of the hybrid turbine of FIG. 2.
Figure 3:
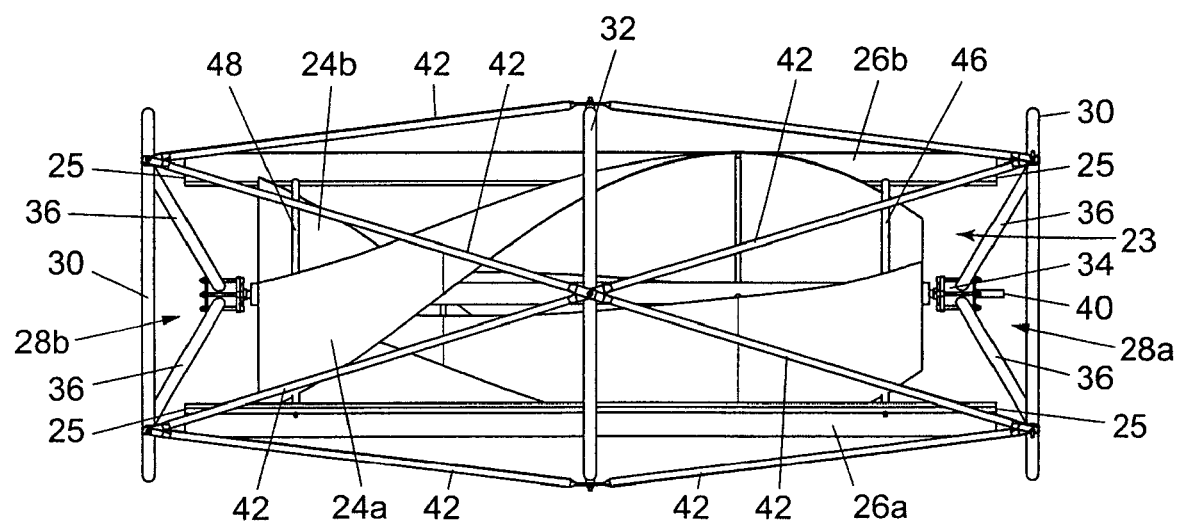
FIG. 3 is similar to FIG. 1, but showing the various turbine blades as having been rotated 45 degrees from their position in FIG. 1.
Figure 5:
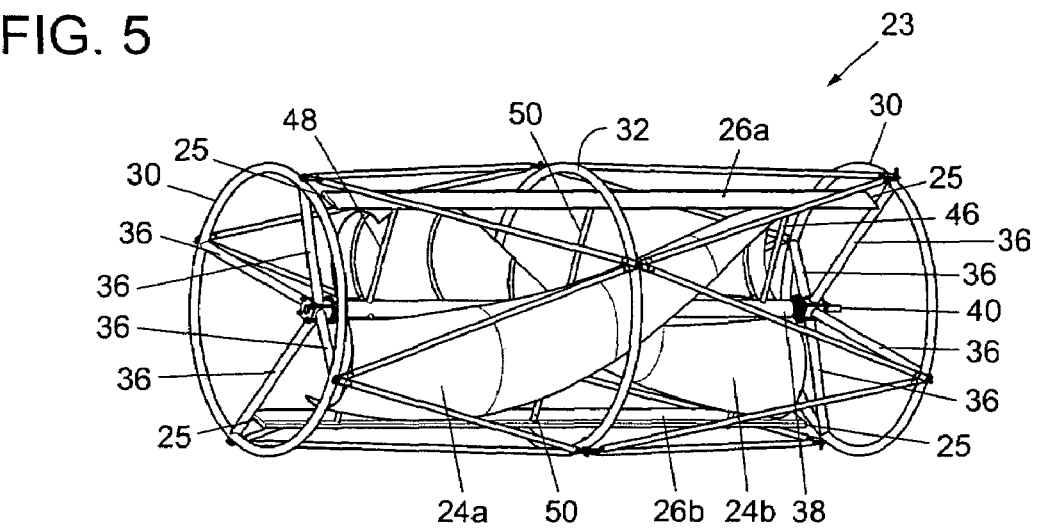
FIG. 5 is a perspective view of the hybrid blade configuration of the hybrid turbine of FIG. 1.
Figure 6:
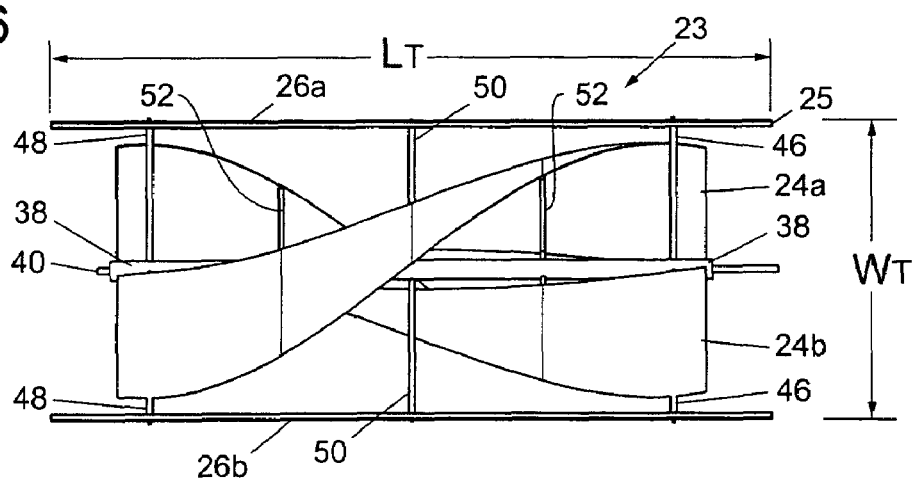
Figure 7:
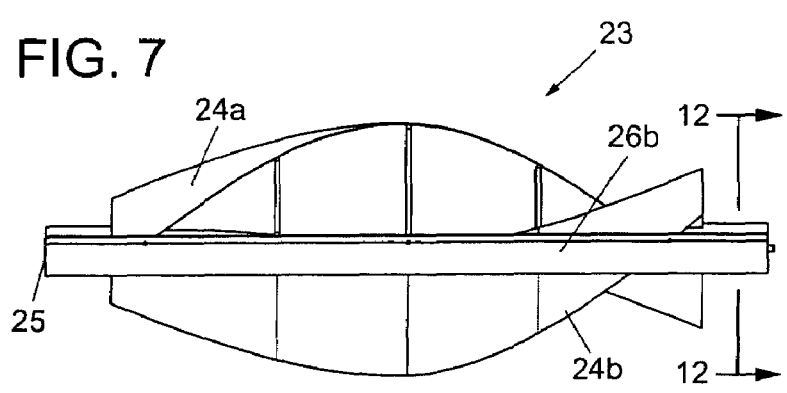
Figure 8:
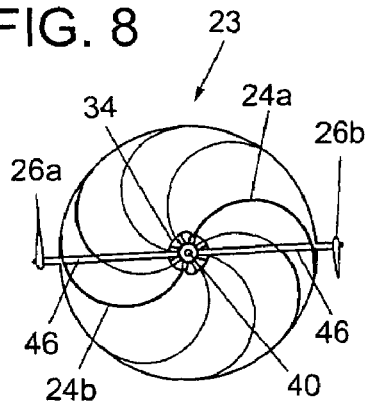
Figure 9:
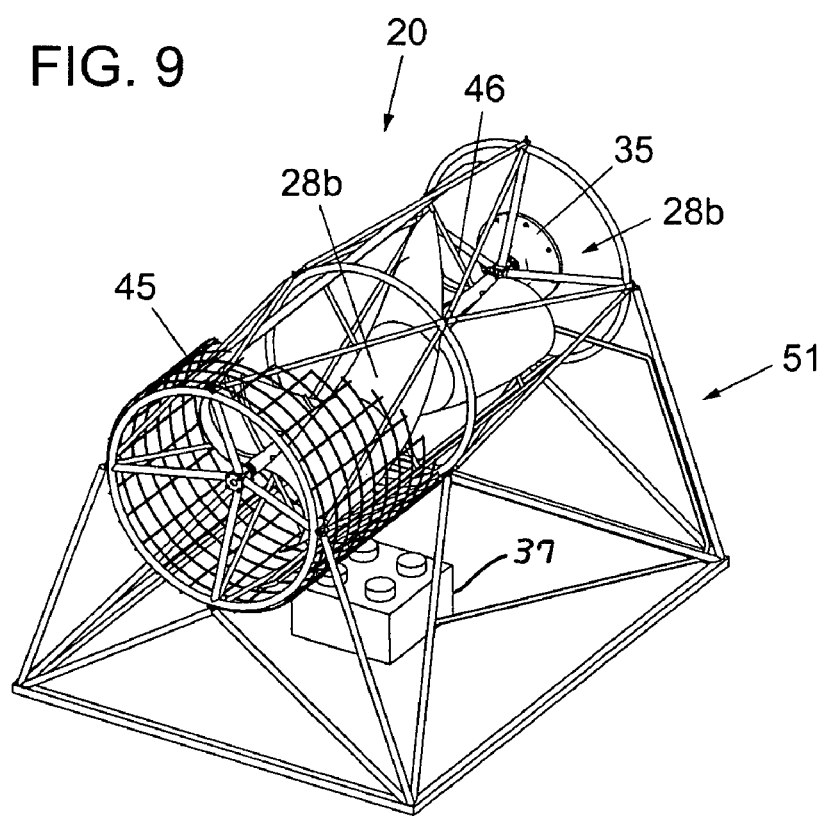
Figure 10:
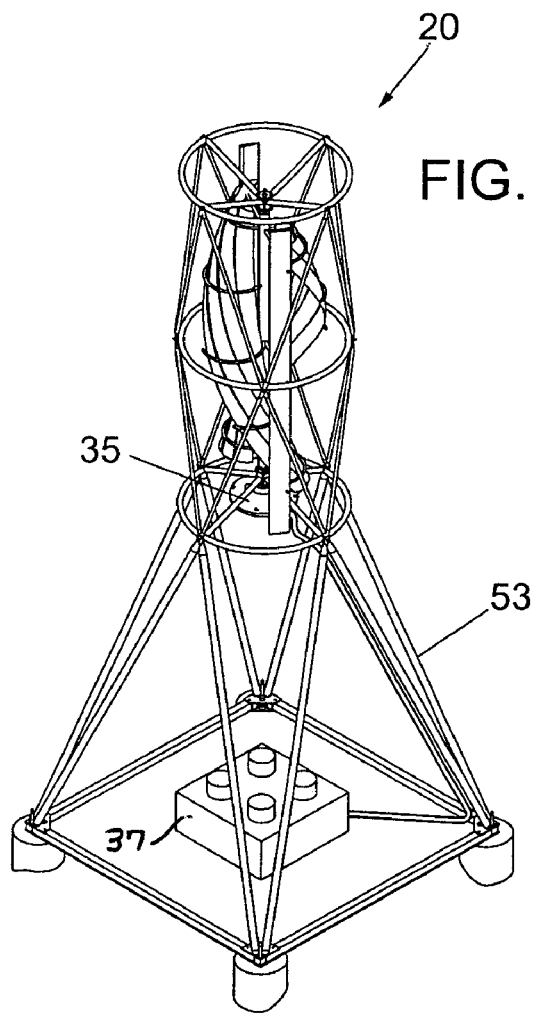
Figure 10A:
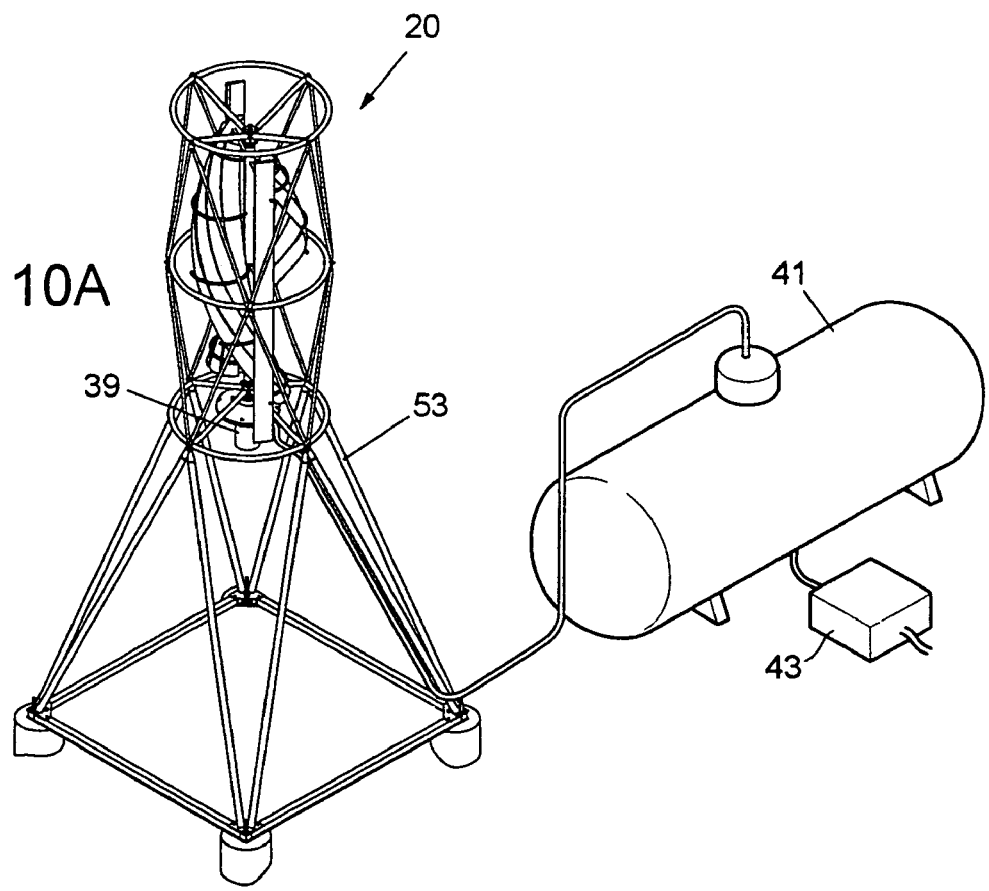
Figure 18:
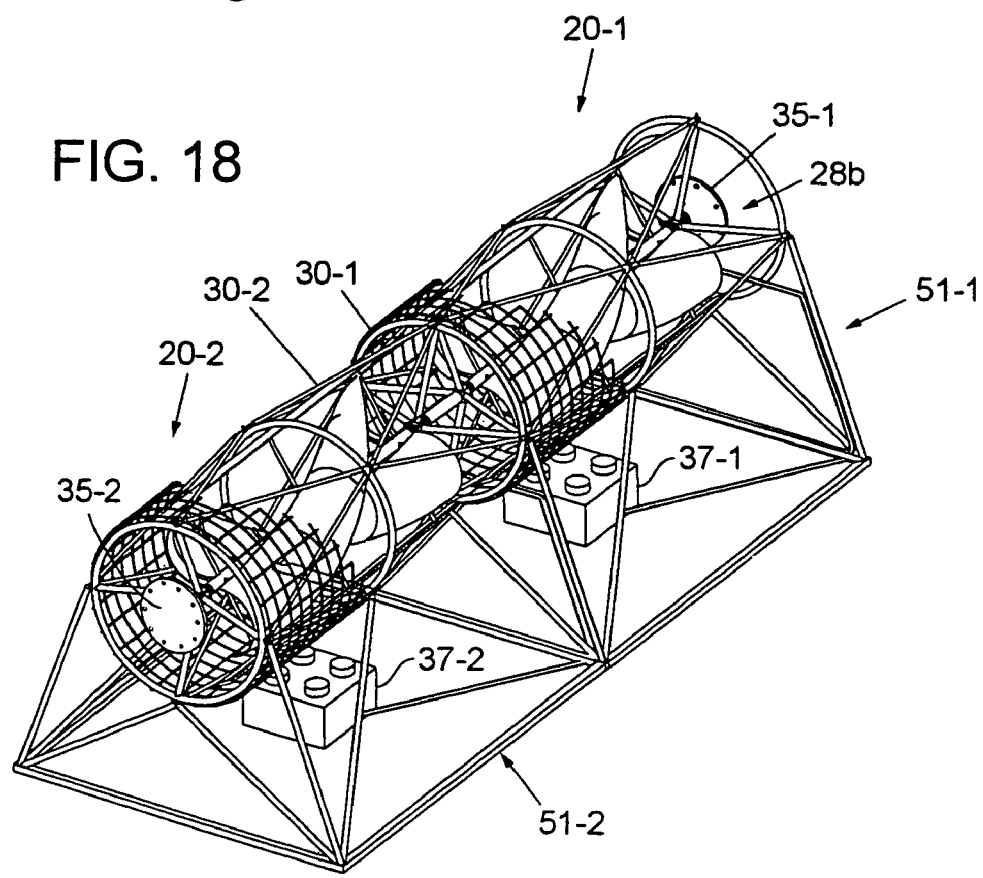
Figure 11:
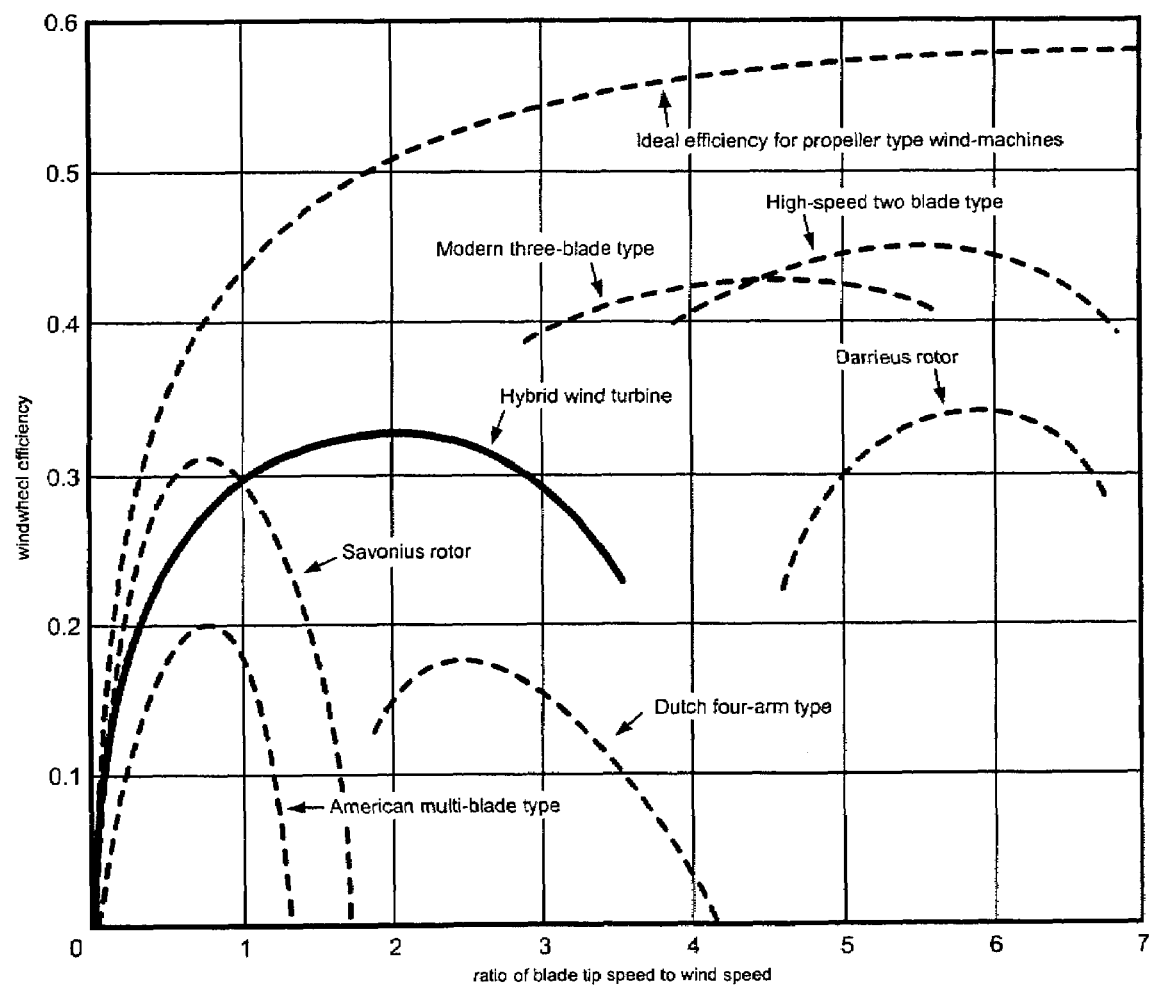
Figure 12:
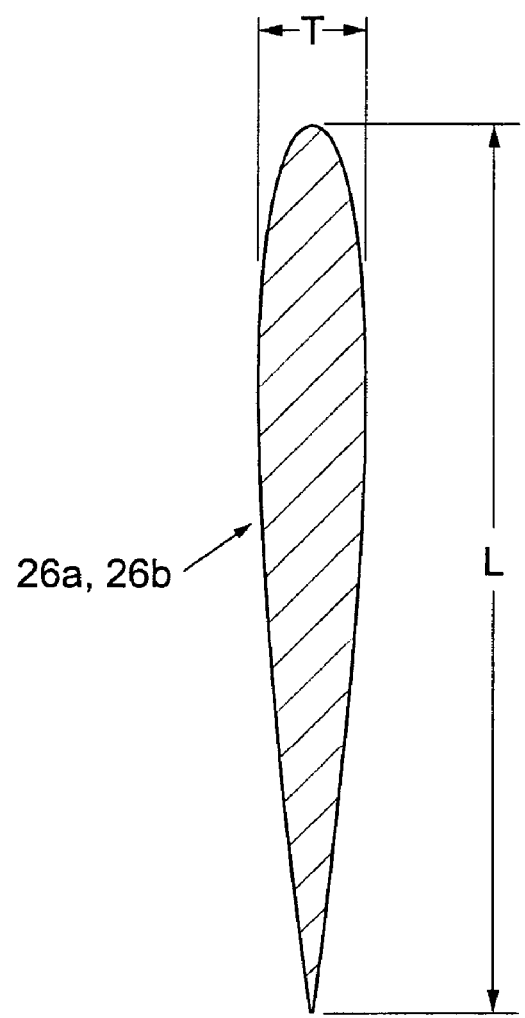
Figure 13:
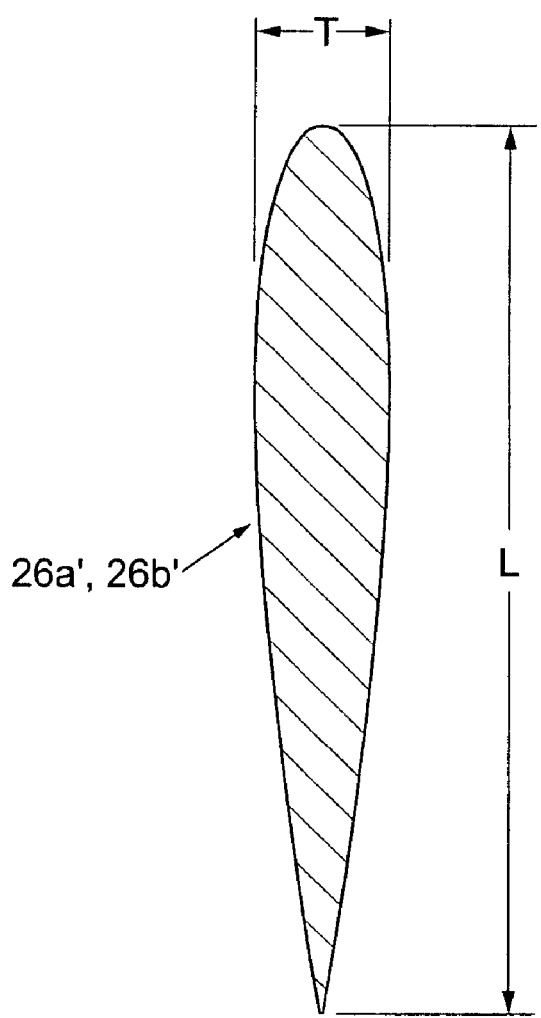
Figure 14A:
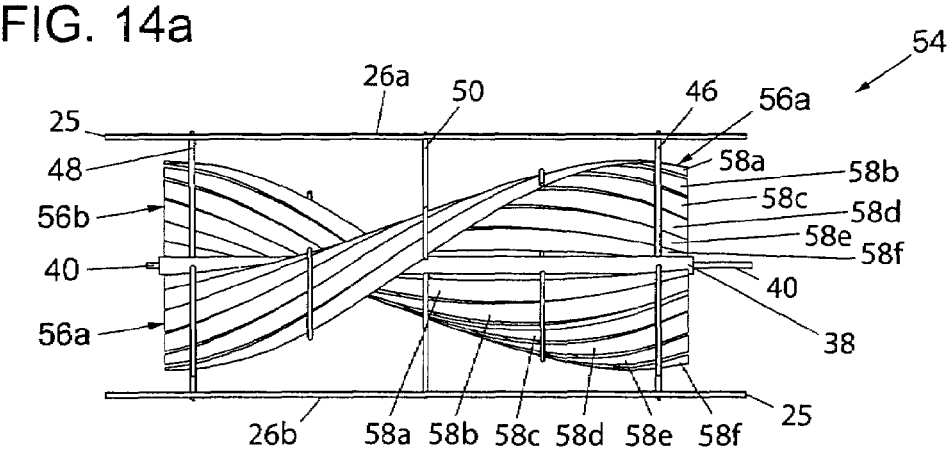
Figure 14B:
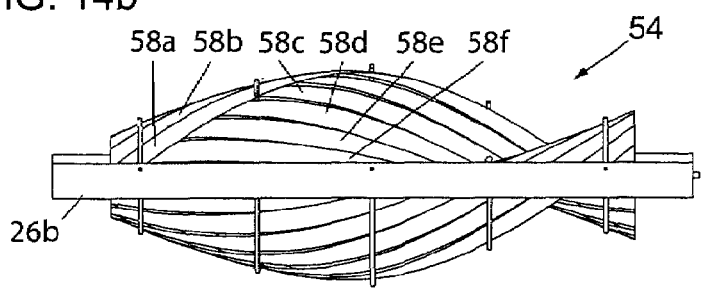
Figure 14C:
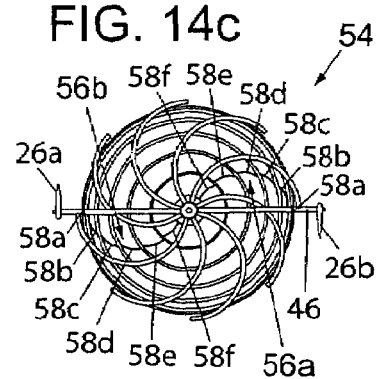
Figure 15A:
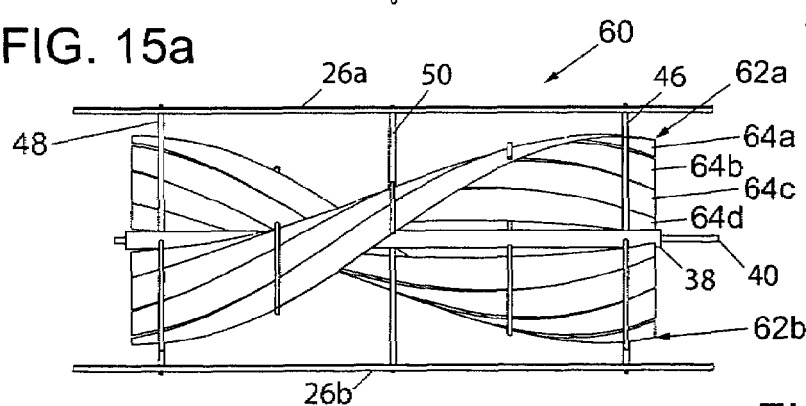
Figure 15B:
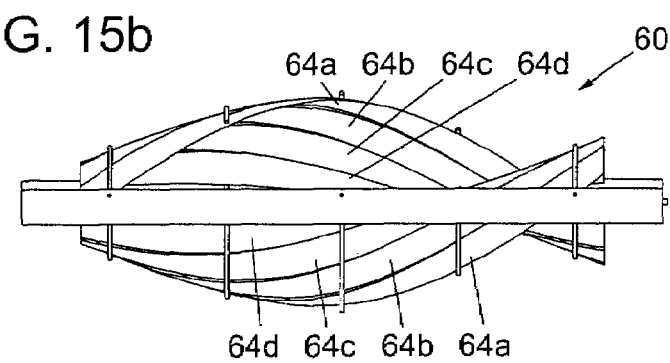
Figure 15C:
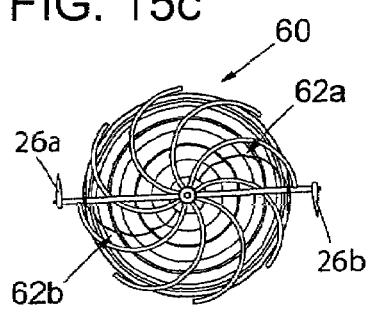
Figure 16A:
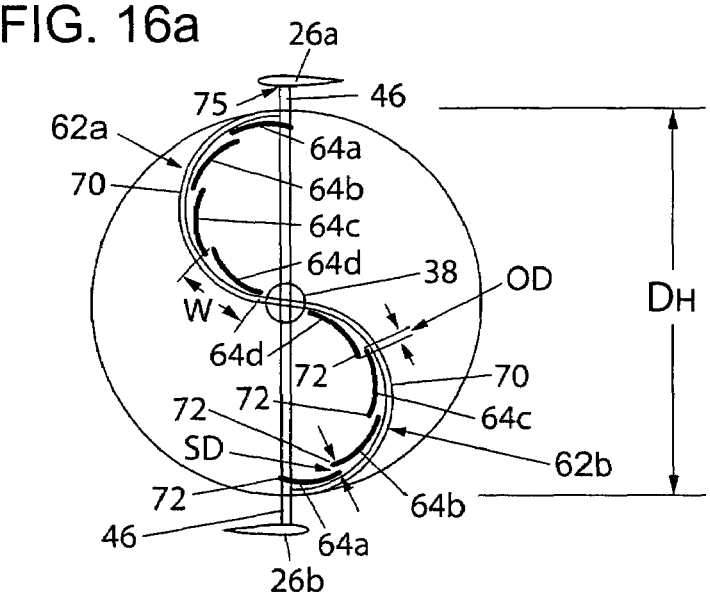
Figure 16B:
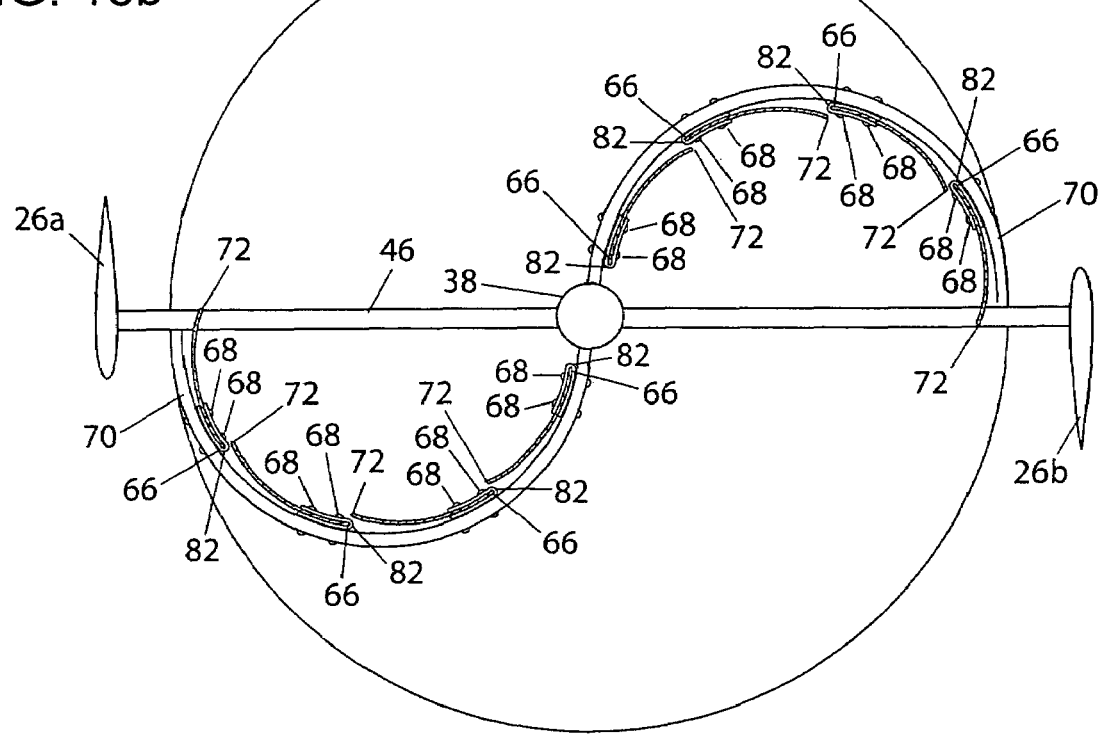
Figure 17:
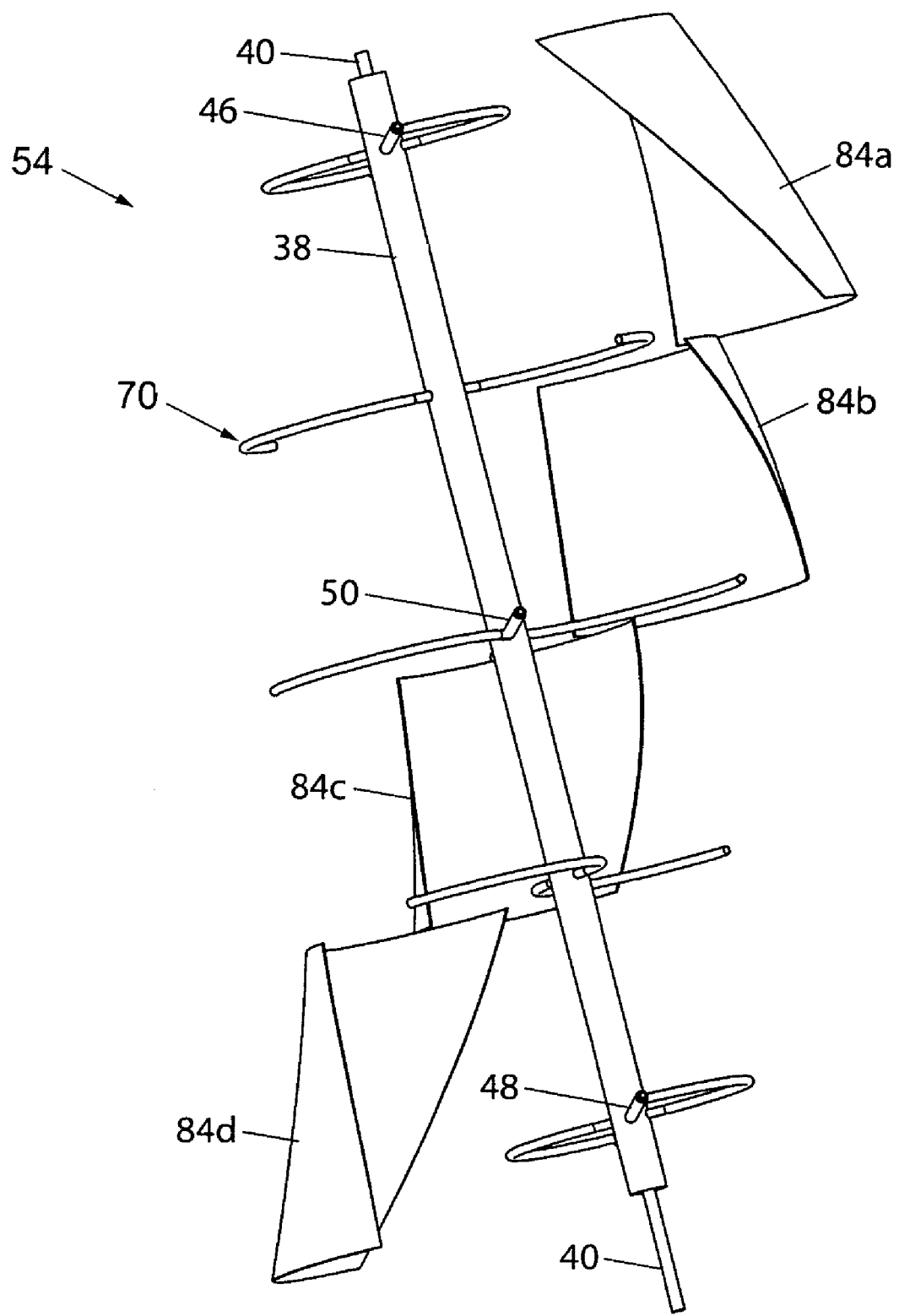

FIGS. 6, 7, and 8 are similar to FIGS. 1, 2 and 4, respectively, showing for the turbine blade components, but with cage structure removed for better viewing;

FIG. 9 is a perspective view of the hybrid turbine of FIG. 1, as mounted horizontally, with partial cage, frame mounting, and power generation structure;

FIG. 10 is similar to the hybrid turbine of FIG. 9, but with segmented inner helical blades, less certain cage components, and as mounted in a vertical orientation;

FIG. 10A is similar to the hybrid turbine of FIG. 10, as mounted in a vertical orientation, and showing an air motor and air storage tank;

FIG. 11 is a graph representing performance characteristics (comparing wind speed versus blade tip speed) for both the present invention and known prior wind turbine designs;

FIG. 12 is an enlarged cross-section of the present invention's airfoil blade, as taken along the lines 12-12 in FIG. 7;

FIG. 13 is a cross-sectional view, similar to FIG. 12, but of a modified airfoil blade design for different wind applications;

FIGS. 14a, 14b, and 14c are similar to FIGS. 6, 7 and 8, but show one type of helical vane segmentation structure for certain operational applications;

FIGS. 15a, 15b, and 15c are additional enlarged cross-sectional views, similar to FIGS. 14a, 14b, and 14c, but of a different inner helical blade configuration showing modified vane segmentation structure for different operational applications;

FIG. 16a is an enlarged end view of a segmented turbine blade assembly, similar to FIG. 15c, but partially rotated, to better depict certain segmented vane blades and separation aspects;

FIG. 16b is a further enlarged end view of one helical half wing, showing vane segments and support structure;

FIG. 17 depicts, as an exploded assembly view, how the individual curved flat panels attach to a helical half wing frame to form one of the modified smooth-walled inner helical blade assemblies; and FIG. 18 is a perspective view of the hybrid turbine of FIG. 9, as mounted in a modular combination with a second hybrid turbine, and showing a shared battery storage unit.

VI. DETAILED DESCRIPTION OF THE INVENTION

Having reference to the drawings, wherein like reference numerals indicate corresponding elements, there is shown in FIGS. 1 through 5 an illustration of a hybrid wind turbine device forming one embodiment of the present invention, namely a non-segmented blade version, as generally denoted by reference numeral 20. Hybrid turbine 20 includes an outer protective safety frame or cage generally denoted by reference number 22, and a combination turbine blade assembly 23 comprising a pair of non-segmented (generally smooth-walled) helically twisted inner turbine blades, namely helical half wing blades 24a, 24b, and a pair of diametrically opposed outer airfoil blades 26a, 26b. Each of the helically twisted inner turbine blades and the outer airfoil blades cooperates in wind conditions to drive the operation of the other type blade. Further, each of the helically twisted inner turbine blades and the outer airfoil blades cooperates to form an inherent structural geometry which guards against over-speeding run away conditions.

The cage 22 comprises a pair of generally concave hub ends 28a, 28b, each comprising a rigid outer support ring member 30. There is also a similar central cage support ring member 32. Each of hub ends 28a, 28b has a central journal hub 34 and outwardly-extending support arms 36 connected to ring 30. The helically twisted inner turbine blades may be journaled for rotation about a common axis and having an outer diameter 31 (FIG. 4). For example, in one embodiment, a main turbine mast 38, with reduced shaft ends 40, may be rotatably journaled within each journal hub 34. Preferably, each journal hub 34 carries suitable self-lubricating ball bearing bushings (not shown) to help reduce rotational friction, vibration, and noise. A suitable alternator, such as, for example, a direct drive permanent magnet alternator, see reference numeral 35 in FIG. 9 and 10, as attached to a shaft end 40, can be used to collect and convert the "rotational energy" power harnessed by the present wind turbine 20.

Safety cage 22 also comprises a series of elongated tie members 42, all of which are rigidly affixed, such as by threaded fasteners or welding, to the respective end and central support ring members 30, 32. Although omitted from FIGS. 1-5 for better viewing, the outer cylindrical surface of safety cage 22 is preferably covered with a suitable protective wire mesh 45, such as formed of commercially available rectangular-mesh wire fencing material (see FIGS. 9 and 10). It will be appreciated that the protective mesh 45 may be made of any suitable material, including for example, a plastic, or other durable material. It will be further appreciated that if the protective mesh 45 is constructed of a sufficiently strong material, the safety cage 22 may be significantly reduced, if not eliminated completely, as long as the turbine mast 38 is supported and journaled for rotation by the protective mesh. The protective mesh 45 allows the swirling wind regimes present about turbine 20 to reach both sets of the inner helical blades 24a, 24b, and outer airfoil blades 26a, 26b, yet otherwise prevent unwanted entry of human limbs, birds in flight, or other large objects that might otherwise undesirably impinge upon the respective turning blades. If desired and where considered necessary, and particularly for use on a congested urban rooftop, high-rise, and other building-attached applications, an even finer mesh screen can be used for the protective mesh 45; it can be formed with sufficiently small enough gage screen wire to prevent children's hands, broomsticks, metal rods, and other smaller objects from being inserted through the wire mesh. On the other hand, in some special applications, an open (e.g., 2 inch by 2 inch) heavy wire mesh (not shown) can be used alone to structurally support the axial cage structure for the present hybrid wind turbine's uses.

Preferably, the elongated airfoil blades 26a, 26b are formed as straight length blades, of a symmetrical cross section, with ends 25 that extend beyond the length of the inner helical blades 24a, 24b. Further, the overall length of the airfoil blades 26a, 26b is preferably with the range of some 105% to 150% greater than the overall length of the helical blades 24a, 24b, and more preferably, some 120% greater. This allows a substantial percentage of the available wind energy, especially at higher wind speeds, to be harnessed by the more efficient airfoil blades 26a, 26b. Advantageously, the somewhat shorter length of the helical blades (vs. larger airfoil blades) allows for use of concave-shaped hub ends 28a, 28b, which in turn allows room to house an associated energy transformation, power conversion and/or power generation unit, namely, for example a direct drive permanent magnet alternator 35 which may be attached directly to an electrical circuit (not shown), may be attached to a battery 37 for electrical storage, or the like. It will be appreciated by one of ordinary skill in the art that any suitable generator may be used as the alternator 35, including, for example, a belt-drive or direct-drive type permanent magnet alternator, a belt-drive or direct-drive type generator, or alternatively, a belt-drive or direct-drive type air motor.

As best seen in FIGS. 5, 6, 8, and 17 (the latter an exploded assembly view), a series of transverse blade support struts extend radially from turbine mast 38, and rotate therewith, to appropriately support, at each end as well as in the central area, the two helical half wing blades 24a, 24b, as well as the outer airfoil blades 26a, 26b. More specifically, these supports include pairs of end support struts 46, 48, and central support struts 50. As shown in FIG. 6, traverse blade support struts may radially extend from the central axis without extending from the turbine mast 38, thereby allowing the turbine mast 38 to not necessarily continuously extend through the two helical half wing blades 24a, 24b. In other words, the turbine mast 38 may be constructed of a pair of non-contiguous mast sections which cooperate to support the helical half wing blades 24a, 24b. If needed, even additional auxiliary support struts can be used, as seen in FIGS. 9, 10, and 17 with intermediate support struts 52, giving a total of five support struts for each helical half wing 24a, 24b. The latter is preferred when, as seen in FIG. 17, particularly for ease of manufacture and shipping in a small container in a flat condition, each smooth-walled helical half wing blade 24a, 24b is formed of four distinct flexible panels 84a, 84b, 84c, and 84d, and then assembled in abutting or overlapping edge fashion (via fastening with pop rivets or other connector—not shown— to the respective struts on mast 38) to create the respective generally smooth-walled helical half wing blades. It will be further appreciated that the intermediate supports struts 52 may be detached from the turbine mast 38 allowing the mast and supports to be disassembled for shipment and reassembled at a distant location.

FIG. 9 depicts a horizontal mounting for the hybrid wind turbine 20 of the present invention, where the hybrid wind turbine 20 has its protective cage 22 mounted upon a low-lying support stand 51. As seen, a direct drive permanent magnet alternator 35 can be used, as mounted within the concave hub end 28b. The horizontal mounting arrangement of hybrid wind turbine 20 shown in FIG. 9 is suitable for roof-top mounting applications, such as in urban buildings, or mounted at ground level.

There is shown in FIG. 10, however, a more preferred vertical-mounted orientation for hybrid wind turbine 20. As shown there and as later described, the helical half wings are depicted as being formed of multiple vane segments. The support stand 53 is modified from that of stand 51 of the horizontal mounting depicted in FIG. 9, but is otherwise the same. As typically used in low power electrical situations, a low RPM direct drive permanent magnet alternator 35 is again used. However, a chain drive-type or belt drive-type generator (not shown) could be alternatively utilized. The vertical mounting arrangement shown in FIG. 10 is preferred because, regardless of which direction the wind is blowing from, such a vertically-aligned turbine 20 is able to harness wind from essentially all the swirling, gusty wind regimes being presented against it.

As shown in FIG. 10A, there is illustrated an embodiment of the hybrid turbine 20 wherein a direct-drive type air motor 39 is used as an associated energy transformation, power conversion and/or power generation unit. The air motor 39 may be, for example, an air motor marketed by Gast Manufacturing, Inc., of Benton Harbor, Mich. The air motor 39, which converts rotational energy into pressurized air, operates to pressurize an air storage tank 41. The pressurized air in the tank 41 may then be utilized by an air motor driven generator 43 to produce an electric current (i.e., an air-to electric generator) as desired, and whether continuously, on-demand, or during peak energy demand periods.

Turning to FIG. 12, there is shown the cross-sectional shape of the airfoil blades 26a, 26b. As seen, generally symmetrical airfoil blade shapes are used, although non-symmetrical airfoil blade shapes may also be used. They can be formed of extruded or molded aluminum, molded or extruded plastic, or similar materials. More specifically, and as particularly chosen for use in lower height applications, where generally lower wind speed conditions will normally occur, or otherwise in urban buildings under 50 stories (i.e., generally under 500 feet or approximately 152.5 meters in height), a low-speed design of airfoil blade is selected. That is, for such lower widespread operational settings the preferred airfoil blade shape, per FIG. 12, is selected as a low-speed National Advisory Committee for Aeronautics ("NACA"), NACA 0015 airfoil-type design blade. As seen, such a NACA 0015 airfoil blade design has generally a wide thickness T and a squat parabolic length L of the blade in cross-section. In one prototype made in accordance with this invention, the airfoil blades 26a, 26b were formed of extruded aluminum, where T was approximately 0.9004 inch, and L was approximately 6 (six) inches.

On the other hand, there is seen in FIG. 13 a modified cross-sectional shape of the outer airfoil blades, 26a', 26b', namely for use in a combination turbine blade assembly 23 in high wind speed applications, or otherwise for use in higher urban building elevations (generally from 500 feet or 152.5 meters high and above). In those potentially more extreme wind applications, a different and higher speed airfoil blade design is preferred, namely a high-speed NACA 0012 airfoil blade design. As seen in FIG. 13, and as contrasted to the airfoil blade profile of FIG. 12, such a modified airfoil design for generally higher wind speeds, generally has a long length L, and thin thickness T. In a different prototype made in accordance with this invention, again formed of extruded aluminum, T was chosen as 0.7202 inch and L was chosen as 6 (six) inches. It will be appreciated by one of ordinary skill in the art that any suitable material may be used to construct the airfoil blades 26*a*, 26*b*, including, for example, extruded aluminum, a aluminum sheet cladding over foam plastic, molded or extruded plastic material such as PVC, polystyrene or polycarbonate, a combination of the above, or other similar material.

As seen when comparing FIGS. 12 and 13, the shape of the outer airfoil blades can be adjusted as needed depending on the given wind power generation requirements. Even other shapes of airfoil blades, including non-symmetrical blade designs, can be utilized, depending on the annual wind conditions expected for a given installation. That is, for extreme wind conditions, and for very high elevations (e.g., over 50 stories and generally over 500 feet or approximately 152.5 meters in height), the airfoil blades 26*a*, 26*b* can be greatly modified as needed. In that way, the combination turbine blade assembly 23 can be customized within the dimensional confines of a given hybrid wind turbine 20, yet without requiring changes to the turbine's other component parts.

As shown in FIGS. 1-8 (and as will be further described relative to FIGS. 14*a*- 14*c*, and 15*a*-15*c*), the respective inner helical half wings 24*a*, 24*b* have preferably been twisted through 180 degrees, i.e., from one end to the other. However, that helical blade twist can fall within the range of end-to-end twist from as little as approximately 45 degrees to as much as approximately 270 degrees, while still achieving the operational efficiencies of the hybrid wind turbine 20 of the present invention. Further, the smooth-surfaced inner helical half wing blades 24*a*, 24*b* can each be formed of one continuous wing member, or more preferably, for ease of manufacture and shipping purposes and as explained above, be formed of four or more individual flat-curved panel segments whose edges abut or slightly overlap one another, and are mounted to the respective support struts via rivet fasteners, or other connector, i.e., to form each overall smooth-surfaced helical half wing.

Turning to FIGS. 14*a*, 14*b*, and 14*c*, there is shown another and the preferred form of the invention, namely one having a segmented-type hybrid turbine blade assembly, generally denoted by reference number 54. Segmented turbine blade assembly 54 utilizes the same end struts 46, 48, central strut 50, turbine mast 38 with reduced ends 40, and same outer airfoil blades 26*a*, 26*b*. However, instead of utilizing the generally smooth-surfaced helical inner turbine blades 24*a*, 24*b* (of combination blade assembly 23 per FIG. 6), the modified type blade assembly 54 utilizes elongated segmented-type helical inner turbine blades 56*a*, 56*b*. More specifically, as seen in FIGS. 14*a*, 14*b*, and 14*c*, each such helical half wings 56*a*, and 56*b* is respectively formed of, for example, six separate vane segments, denoted by reference numerals 58*a*, 58*b*, 58*c*, 58*d*, 58*e*, and 58*f*. Thus, such a separate six (6)-vane segment design (for each helical half wing 56*a*, 56*b*) results in a total of twelve (12) vane segments. That type segmented helical blade design would preferably be used in higher heights, and greater wind speed installations, such as when used in a hybrid wind turbine 20 mounted atop a high rise building, whether mounted horizontally or vertically. Of course, it will be understood that the number of vane segments may vary according to design considerations and may do so from as little as two vane segments (for lower speed wind installations) to as many as may be manufactured and fastened to the turbine blade assembly.

On the other hand, such as for use in lower height and lower speed wind installations, there is shown in FIGS. 15*a*, 15*b*, and 15*c* a modified form of segmented type combination turbine blade assembly, generally denoted by reference numeral 60. Again, modified segmented turbine blade assembly 60 utilizes the same support struts 46, 48, and 50, central mast 38 with reduced ends 40, and straight airfoil blades 26*a*, 26*b*. However, this time each segmented helical half wing 62*a*, 62*b* is respectively formed of only three vane segments 64*a*, 64*b*, 64*c*, for a total of six (6) such vane segments across modified blade assembly 60.

The attachment of the respective vane segments to a tubular support frame 70 will now be described. The support frame may be formed of tubular metal, plastic, or similar material. As depicted in FIGS. 16*a* and 16*b*, relative to modified assembly 60, each respective vane segment 64*a*, 64*b*, and 64*c* has a first longitudinal or fixed edge 66 that is affixed via a fastener 68 (such as a pop rivet) to the support frame 70. There is also a second longitudinal or free edge 72 which is free floating, i.e., not affixed to any structure, and, which overlaps, by an overlap distance OD, the affixed edge 66 of the next adjacent vane segment. It has been found that the overlap distance OD can be in the range of from approximately zero to 2 inches. Thus, one vane segment overlaps and cascades over the next adjacent outer vane segment. For example, as seen in FIG. 16*a*, the free longitudinal edge 72 of vane segment 64*b* is free floating and separated by a separation distance SD from the first or fixed longitudinal edge 66 of adjacent vane segment 64*c*. It will be appreciated that in another embodiment, the free edge 72 may substantially abut, rather than overlap the affixed edge 66 of the next adjacent vane segment. It will be further appreciated that in yet another embodiment, the free edge 72 may be separated from the affixed edge 66 of the next adjacent vane segment forming a permanent air slot with the separation distance SD. Frame 70 is preferable formed of tubular galvanized steel material. Each vane segment is preferable formed of an ultraviolet light-inhibiting plastic, such as ultraviolet light-resistive polycarbonate material or ultraviolet light-resistive polyvinyl chloride (PVC) material, fiber glass sheeting, aluminum, light steel sheeting, Kevlar, polyurethane, rubber sheeting material, or the like.

During rotation of the hybrid wind turbine formed with a segmented blade assembly, the separation distance SD can vary greatly depending on the material used for each respective vane segment, the running width W of each vane segment, the flexibility present in a given vane segment between its fixed longitudinal edge 66 and its free edge 72, and the given wind speeds (i.e., air pressure) being encountered by the wind turbine at any given moment.

For example, prototype units were made in accordance with the present invention, where the overall blade length for airfoil blades 26*a*, 26*b* was approximately 9.5 feet, the overall length of the helical half wings 62*a*, 62*b* was approximately 8 feet, the diameter of joined helical half wings (designated as $D_H$ in FIG. 16*a*), was approximately 50 inches, the respective vane segments 64*a*, 64*b*, and 64*c* were formed of a flexible material, with a vane width W of approximately 9 inches, a vane thickness of some 0.2 inches, and there was an approximately 2 inch gap present between the outer edge of the helical half wings and the innermost edge of the respective airfoil blades. In the presence of a 15 mph wind, it was found that the separation distance SD, and hence elongated air slot, created between the vane segments was in the range of approximately ⅛ to ¾ inch, and generally about ⅜ inch. Moreover, it was also found that, in winds generally above 25 mph, and where the vane segments were formed of a substantially flexible material, such as rubber sheeting, and regardless if a given portion of a helical half wing was in a wind-gathering or non-wing gathering condition, the respective free floating edge 72 was maintained at a substantially constant separation distance SD. In effect, the presence of vane segmentation allowed the helical half wings to have air slots that cooperatively act as an "air valve", i.e., between respective vane segments. On the other hand, when the vane segments were formed of a somewhat stiffer, yet flexible, sheeting material such as ultraviolet light-resistive polycarbonate, it was found that for the same prototype unit, the separation distance SD created was somewhat greater for the outermost vane segments, e.g. vane segments 58*a* and 58*b* in FIG. 14*c*, and somewhat lesser for the inner vane segments, e.g., segments 58*c* through 58*f*.

It will be appreciated by one of ordinary skill in the art that even though specific examples of measurements are giving in illustrated embodiment above, various modifications in the dimensions of the components may be made without deviating from the teachings of the present invention. For example, the diameter of the outer airfoil blades 26*a*, 26*b* may be in the range of approximately 4 to 24 inches greater than that of the outermost edge of the inner half wing blades 24*a*, 24*b*, the length of the turbine mast 38 may be in the range of approximately 8 to 10 feet, the length of each half wing blade 24*a*, 24*b* may be in the range of approximately 6 to 9 feet, and the length of each airfoil blade 26*a*, 26*b* may be in the range of approximately 9.5 to 11.5 feet. Similarly, the half wing blades 24*a*, 24*b* may have a thickness in the range of approximately 0.03 to 0.25 inches, each vane segment 58*a*, 58*b*, 58*c*, 58*d*, 58*e*, 58*f* may have a width in the range of approximately 3 to 11 inches, the diameter of the half wing blades 24*a*, 24*b* may be in the range of approximately 24 to 50 inches, and the cross sectional thickness of each airfoil blade 24*a*, 24*b* may be in the range of approximately 0.5 to 1.5 inches.

Thus, the segmentation-type combination turbine blade assemblies 54 and 60 have distinct advantages over the smooth surface-type blade assembly 23 (where the helical half wings are formed of only a generally smooth surface, or of edge-abutting flat panel sections creating a generally smooth surface, and without any segmentations and without otherwise having separate flexible vane segments with free-floating edges). For example, the elongated segmentation of the helical half wings in the present invention, which is the preferred embodiment, results in a substantial reduction in the air drag, contrary to what was previously present with Savonius type blade systems, including the twisted S-type helical versions thereof. By way of explanation, as the rear or leeward side of a non-segmented Savonius blade rotates into position against the wind, i.e., after just being in a wind gathering mode, it enters a non-gathering wind position. In that condition, the blade's concave back side presents a substantial drag against performance.

However, with the present invention's preferred segmentation structure, oncoming swirling wind is allowed to simply filter through air slots present in the back side of the cascading, overlapping, and segmented helical vane segments (e.g., vane segments 64*a*, 64*b*, 64*c*). This occurs due to the presence of the air slots provided via segmentation distances SD. (To visualize, this is not unlike the slots formed among and between the edges of a series of Venetian blinds as helically twisted 180° from end-to-end.) This allows one vane segment to create a vacuum effect to lift the free edge of the next adjacent vane. For example, it has been noted that at start up and at lower speed rotations, the respective vanes of the helically twisted blades of the present hybrid wind turbine 20, formed as having vane segments, tend to close on one another as they take in air, and then slightly open on the backside or leeward side of a cycle, i.e., the non-wind gathering side, to create elongated air slots and thereby reduce air drag by letting air through. However, as described above, when at full rotational speeds and particularly with very flexible vane material (e.g., rubber sheeting), the separation distances SD created between vane segments essentially stay constant throughout the full rotational cycle, i.e., during both the wind gathering and non-wind gathering cycle portions. In effect, the presence of the vane segments in the helical half wings helps substantially overcome the prior art problem of so-called "blade profile differentiation", as was common with most Savonius blade systems. Thus, the segmented vane structure helps substantially increase the performance capability for the respective helical half wing portions of the segmented combination blade assemblies 54,60, particularly in high speed winds, e.g., over 45 mph.

Then, during high operational, i.e., higher wind speed, conditions, the vane segments, even when in their wind-gathering condition, have the tendency to "open up". This allows yet even more wind to flow through the air slots formed by the segmentation distances SD. This, in turn, results in allowing the segmented helical half wings to rotate even faster than they normally would, because they are under the rotational influence of the much higher operational speed airfoil blades 26*a*, 26*b*. Thus, the normally slower inner Savonius-type turbine blades have the tendency to get out of their own way, i.e., to increase overall hybrid turbine performance and efficiencies at higher wind speeds.

Then, further still, in extremely high rotational speed conditions, the vane segments actually act as an "airbrake", relative to the airfoil blades, helping to prevent runaway conditions when operational safety might otherwise be of concern for the turbine 20. That is, under extreme wind conditions, the segmented helical half wings, even though the vane segments thereof are opened up with air slots, tend to continuously brake or slow down the otherwise excessively freely-rotating outer airfoil blades 26*a*, 26*b*, to keep the entire hybrid blade assembly 23 from over-speeding.

It has been found that in normal operation, the more segmented (i.e., more individual vane segments) the helical half wings are, the less efficient they are. This is because with such a segmented hybrid turbine, it takes more wind at start up to commence turbine rotation. However, once reaching higher operational speeds, the presence of the extra number of vane segments helps the inner helical turbine blades to, in effect, get out of their own way, thereby helping minimize their own drag effect on the more efficient outer airfoil blades. Thus, it will be appreciated that the choice of individual vane segmentation will depend on the projected operating conditions of the hybrid turbine. For example, in places with traditionally lower wind speeds, a smaller number, for example two vane segments with one air slot per helical half wing, segments may be utilized, while at locations with traditionally higher wind speeds, a greater number of segments may be utilized.

Further yet, it has been noted in smoke-type testing that the segmented helical vanes tend to, in effect, "standardize" the turbulent air within any given gusty wind regime blowing through them, which has the result of greatly assisting the outer airfoil blades' performance. That is, as believed and understood, the segmented twisted vanes tend to organize (or perhaps better stated as "regularize") the wind currents before they reach the respective outer straight airfoil blades. This has the effect of yet further increasing the efficiency of the hybrid wind turbine 20, as especially noted along the outer ends thereof, i.e., by maximizing the efficiency of the outer airfoil blades via standardizing the amount and flow pattern of wind currents that reach them.

Still further, it has been found via testing that by using straight length blades, rather than curved length blades, for airfoils 26a, 26b, when in combination with the inner helical blades 56a, 56b (or 62a, 62b), the overall efficiency and operational speed of the present hybrid wind turbine, in any given speed wind, is greatly improved. As to the form of attachment for the respective outer straight airfoil blades 26a, 26b, those blades, as preferably formed of a suitable extruded aluminum material, are welded via welds 75 into the end of the respective metal support struts 46, 48, 50 (see, for example, FIG. 16a) which are part of support frame 70. Depending upon given wind speeds, the operational diameter for the respective airfoil blades 26a, 26b can be chosen to be as little as say 36 inches and as much as 74 inches, with the diameter of the helical half wing blades then proportionally varied.

Such a selected change in the radial positioning for the respective outer straight airfoil blades is quite advantageous. This is because the positioning of the outer airfoil blades 26a, 26b, can be customized for a given installation, all depending upon the expected available wind conditions and regimes. For example, when winds are normally of generally higher speeds, the airfoil blades are formed to have a smaller operating diameter. But when installed where wind conditions are normally of only modest speeds, the airfoil blades 26a, 26b can be positioned at a more outermost position. This approach recognizes that, while airfoil blades in the outermost positions can supply more angular momentum to the hybrid wind turbine, they can also tend to increase chances for unwanted vibration for the overall hybrid wind turbine.

Preferably, the smooth surface helical half wings 24a, 24b of combination blade assembly 23 (per FIGS. 1-8) are formed, whether as one piece or several abutting flat panel sections, of a material that will readily withstand the outdoor elements, e.g., rain and snow, and high and low temperatures, such as an ultraviolet light-inhibited polycarbonate material, or a similar UV-light inhibited PVC (polyvinyl chloride) material, or any other suitable flexible material that can take the shape of frame 70 and be formed into the helical blades 24a, 24b. Further, the elongated vane segments, such as vanes 58a through 58f, or 64a through 64c, can be formed of the same type of material. In any event, such vane segments should be formed of a relatively flexible material, so that the separation distance SD created between vanes can be maximized during normal rotation.

As seen in FIG. 16b, the fixed edge 66 of each respective vane segment is captured and held within an aerodynamically-shaped vane nose bracket 82. The various nose brackets 82 with attached vanes then can be respectively fastened along their length to the support frame 70, by way of a series of fasteners 68, such as pop rivets. This aerodynamically shaped nose bracket 82 may help reduce air drag at the leading fixed edge 66 of the respective vane segment.

Seen in FIG. 11 is a graphical chart of the respective performance efficiencies, over various wind speeds, of different types of wind turbine designs as listed, including the hybrid wind turbine design of the present invention. More specifically, FIG. 11 depicts graphically the relationship of turbine efficiency percentage in the form of the ratio of blade tip speed to wind speed, for numerous different types of prior wind turbine blade designs (see dotted lines). That is, as seen in FIG. 11, the hybrid wind rotor turbine of the present invention (see solid line), which is self starting, is very efficient over a larger range of blade tip to wind speed ratios. Then, as shown in solid line, the efficiency performance of the hybrid wind turbine of the present invention reflects that the initial performance at lower wind speeds performs at the expected output efficiency of normal Savonius-type turbine units. However, at higher wind speeds, the present hybrid unit's performance becomes closer to what is found with traditional Darrieus-type straight-blade turbine units.

Further, FIG. 11 depicts that the hybrid wind turbine of the present invention runs no faster than approximately 3½ wing tip speed versus wind speed, and thus, minimizes any chance of runaway conditions. That is, FIG. 11 shows graphically that as wind speeds move higher, the present hybrid turbine advantageously is progressively constrained by the typical air drag effects common to helical Savonius-type turbine units, thus resulting in the controlled performance unique to the present hybrid wind turbine design.

In operation, the helical half wing blades of the present hybrid turbine blade invention (whether of smooth-walled or vane segment type) commence rotation quickly, i.e., with as little as 4 to 6 mph wind. Thus, the inner helical half wing blades 24a, 24b quickly start the overall hybrid wind turbine 20 into rotation. Thereafter, the straight airfoil blades 26a, 26b begin rotating, again as initially powered by the helical blades, and then at higher wind speeds they start harnessing wind and generating power at their much higher efficiency level, i.e. at their higher blade-tip-velocity-to-wind velocity ratio.

Through testing it has been found that there is an optimum ratio of the width $W_T$ (see FIG. 6) of the combination hybrid blade assembly 23 (or alternatively, of the modified segmented combination turbine blade assemblies 54, 60) of the present invention, versus the length $L_T$ of those blade assemblies. That is, for generally higher speed winds, that so-called turbine aspect ratio, including the "reach" or "pitch" relative to the overall swept area, optimally and preferably is approximately a ratio of 1:3. On the other hand, for generally lower speed winds, the optimal turbine aspect ratio is instead lower and approximately 3:5. Furthermore, it will be appreciated that the airfoil blades 26a, 26b may be radially positionally adjustable relative to the half wing blades 24a, 24b to thereby help maximize wind harvesting depending upon the local wind conditions and the mounting height of the turbine blade assembly 23. Still further, it will be appreciated that the number and position of airfoil blades may be varied, including, for example, having three or more airfoil blades. Thus, as seen, the present hybrid turbine can be readily customized for a given wind-harvesting application.

Turning to FIG. 18, there is depicted pair of horizontally mounted hybrid wind turbines 20-1 and 20-2, of the present invention, wherein the hybrid wind turbines 20-1 and 20-2 are mounted in a modular configuration. As seen, each hybrid wind turbine 20-1, 20-2 may be mounted in a separate support stand 51-1, 51-2, and the support stands 51-1, 51-2 may be then assembled in abutting or overlapping edge fashion (via fastening with bolts or other connector—not shown—to the respective outer support ring member 30-1, 30-2) to create the combined hybrid wind turbine.

Each hybrid wind turbine 20-1,20-2 may further have its own respective direct-drive permanent magnet alternator 35-1, 35-2, or other suitable energy transformation unit, connected to an energy storage unit (battery) 37-1, 37-2. If desired, the two storage units 37-1, 37-2 may be electrically combined to enhance their storage capacity.

It will be appreciated that the two hybrid wind turbines 20-1 and 20-2 may be combined in a number of different ways, and in a number of different configurations. While it is preferable that the turbine mast of each hybrid wind turbine 20-1 and 20-2 be mounted so as to operate separately and independently, it will be understood that the two masts may be joined so as to form a combined, elongated central mast. Similarly, the various components associated with the hybrid wind turbines 20-1 and 20-2, may be combined or separated as desired, including having a single alternator, a single battery, or the like.

From the foregoing, it is believed that those skilled in the art will readily appreciate the unique features and advantages of the present invention over previous types and designs of wind turbines and blades therefore. Further, it is to be understood that while the present invention has been described in relation to particular preferred and alternate embodiments as set forth in the accompanying drawings and as above-described, the same nevertheless is susceptible to change, variation and substitution of equivalents without the pressure from the spirit and scope of this invention. It is therefore intended that the present invention be unrestricted by the foregoing description and drawings, except as may appear in the following appended claims.

What is claimed is:

1. A method of achieving maximized wind harvesting for generating electrical power, comprising the steps of:
   providing a rotatably supported helically twisted blade with a plurality of flexible elongated vane segments, wherein each vane segment has a fixed edge and a free edge, and the free edge of one segment one of at least partially overlaps and substantially abuts the fixed edge of the next adjacent vane segment; and
   creating separation air slots between the elongated vane segments by allowing the free edge of at least one vane segment to rise up from the fixed edge of the next adjacent vane segment during rotation of the rotatably supported helically twisted blade,
   wherein during rotational operation, the separation distance between the radially-outermost mounted vane segments is greater than the separation distance between the radially-innermost mounted vane segments; and
   wherein, when operating at high rotational speeds, the respective separation air slots created between vane segments of the helically twisted blade operate as an air brake to help prevent runaway rotational conditions.

2. The method of claim 1, wherein the free edge of each vane segment overlaps the fixed edge of the next adjacent vane segment by a distance in the range from approximately 0 to 2 inches.

3. The method of claim 1, wherein during rotational operation, the free edge of each vane segment is adapted to rise up from the fixed edge of the next adjacent vane segment by a separation distance in the range of between approximately ⅛" to ¾".

4. The method of claim 1, further comprising the step of mounting each of the vane segments within an aerodynamically-shaped vane nose bracket.

5. The method of claim 1, further comprising the step of mounting the helically twisted blade to a substantially vertically aligned rotatable turbine mast.

6. The method of claim 1, wherein the helically twisted blade is rotatably supported within a protective safety cage.

7. The method of claim 1, further comprising the step of converting rotational energy of the rotatably supported helically twisted blade into electrical energy.

8. The method of claim 1, further comprising the step of converting rotational energy of the rotatably supported helically twisted blade into electrical energy utilizing one of a direct drive permanent magnet alternator, a belt drive permanent magnet alternator, a direct drive generator, a belt drive generator, a direct drive air motor and a belt drive air motor.

9. The method of claim 1, wherein the helically twisted blade is twisted from one end to the other end, through a twist rotation of one of approximately 45°, 90°, 180°, and 270°.

10. The method of claim 1, further comprising the step of mounting a plurality of substantially straight airfoil blades fixed for rotation with the helically twisted blade and rotatably supported therewith.

11. The method of claim 10, wherein the airfoil blades are longer than the helically twisted blade.

12. The method of claim 10, wherein the helically twisted blade and airfoil blades are rotatably supported within a protective safety cage.

13. The method of claim 10, further comprising the step of converting rotational energy of the rotatably supported helically twisted blade and airfoil blades into electrical energy.

14. The method of claim 13, wherein the converting step comprises utilizing one of a direct drive permanent magnet alternator, a belt drive permanent magnet alternator, a direct drive generator, a belt drive generator, a direct drive air motor and a belt drive air motor.

15. The method of claim 10, wherein the helically twisted blade is twisted from one end to the other end, through a twist rotation of one of approximately 45°, 90°, 180°, and 270°.

* * * * *